Figure 1:
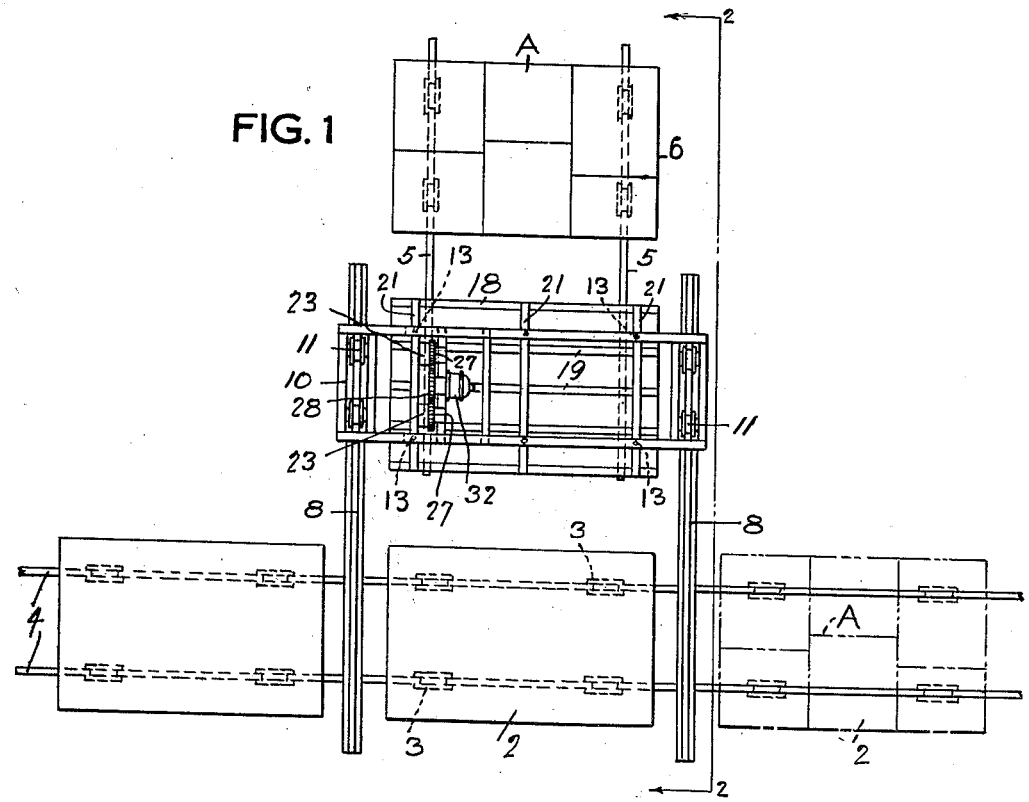

April 21, 1925.

F. E. TROUTMAN ET AL 1,535,064

APPARATUS FOR LAYING PLATE GLASS

Filed Jan. 20, 1923

2 Sheets-Sheet 1

INVENTORS
Frank E. Troutman and
Charles H. Christie.
By Kay, Totten & Brown,
Attorneys April 21, 1925.
F. E. TROUTMAN ET AL
1,535,064
APPARATUS FOR LAYING PLATE GLASS
Filed Jan. 20, 1923    2 Sheets-Sheet 2
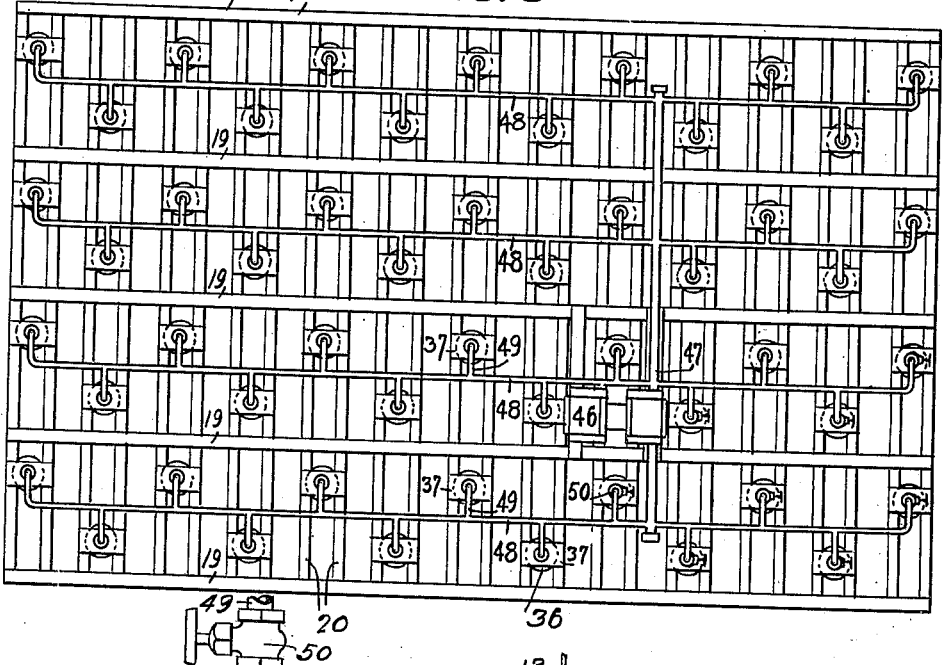
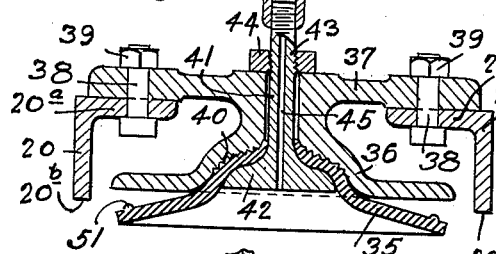
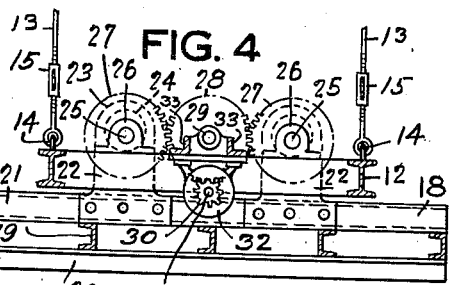
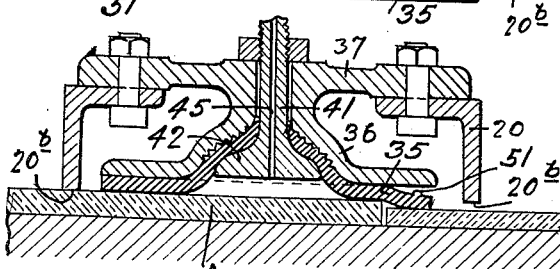
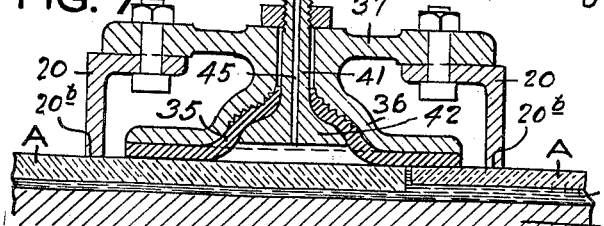
INVENTORS
Frank E. Troutman
Charles H. Christie
By Kay, Totten & Brown
Attorneys Patented Apr. 21, 1925.

1,535,064

UNITED STATES PATENT OFFICE.

FRANK E. TROUTMAN AND CHARLES H. CHRISTIE, OF BUTLER, PENNSYLVANIA.

APPARATUS FOR LAYING PLATE GLASS.

Application filed January 20, 1923. Serial No. 613,949.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Apparatus for Laying Plate Glass; and we do hereby declare the following to be a full, clear, and exact description thereof.

Our invention relates to the manufacture of plate glass and other forms of flat glass, and its object is to provide improved apparatus for laying such glass on grinding or polishing tables, whereby an entire table of glass, including several sheets or pieces, may be laid in plaster simultaneously and with the upper surfaces of the sheets or pieces of glass at an even height, even though the individual sheets may not be of exactly the same thickness.

Plate glass is laid on grinding and polishing tables in plaster. This is done by pouring the plaster on the table, then laying each piece of glass separately upon the plaster and bringing the glass into its proper place by a process of pushing and tramping which is known in the glass industry as "swimming" the glass. This operation of laying each piece separately takes considerable time, and as the plaster sets very quickly, some of the plaster is wasted and must be scraped off the table before the next piece is laid. If one piece of glass is a trifle thicker or thinner than the others, an uneven surface is produced, and this unevenness is often very serious unless the greatest care is taken to match the pieces of glass before they are laid. In practice, it generally takes 10 to 20 minutes of grinding to bring the highest plates down to the level of the low ones, and the time and expense thus wasted are very considerable.

According to our present invention we lay the glass for a whole table at one time, and we do this in such a way that the top surfaces of all the pieces of glass are even with each other, thus saving labor, plaster, and the time consumed in laying the pieces one by one and in grinding away the extra thickness of the heavy pieces. We obtain these results by matching and laying the glass on a table without plaster, then lifting all of the pieces of glass simultaneously by means of vacuum cups carried by a frame which determines the height of the upper level of all of the pieces of glass, transferring the glass to a position above another table which has been covered with plaster or moving the plaster-covered table beneath the frame, lowering the frame to bring the glass into contact with the plaster, and then moving the frame horizontally so as to force the air out from beneath the glass, as in the ordinary swimming operation. The glass is held by suction until the plaster is sufficiently set to support the glass, after which the vacuum cups are released and the frame is removed, leaving the glass upon the grinding table with an even upper surface. When this surface has been ground the glass is removed from the table, inverted upon the preliminary or assembling table, and is again laid for grinding in the same manner as before.

The method of laying flat glass outlined above is described and claimed in our co-pending application for Letters Patent, Serial No. 613,948, filed January 20, 1923. The present application is concerned with the novel apparatus which is employed in carrying out this method.

Figure 2:
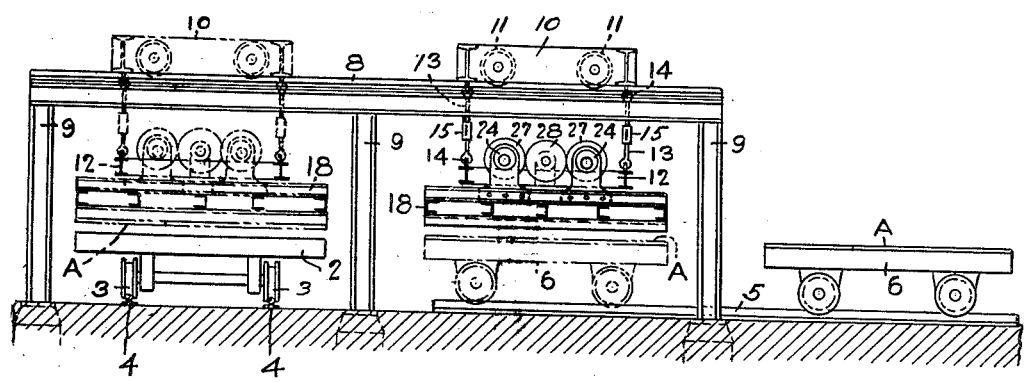

In the accompanying drawing, Fig. 1 is a plan view of a complete set of tables and pneumatic transfer mechanism; Fig. 2 is a side view of the same construction with parts in section on the line 2—2, Fig. 1; Fig. 3 is an enlarged plan view of the pneumatic transfer device; Fig. 4 is an enlarged side view of the motor and gearing for raising and lowering the suction frame; Fig. 5 is a still more enlarged vertical sectional view through one of the vacuum cups; Fig. 6 is a vertical sectional view showing the manner in which the vacuum cups engage pieces of glass of different thicknesses; and Fig. 7 is another vertical sectional view, similar to a portion of Fig. 6, showing the manner in which the upper surfaces of sheets of different thicknesses are brought to the same level.

In the drawing the numeral 2 indicates a table such as is ordinarily used for grinding and polishing plate glass, this table being provided with wheels 3 running on tracks 4. The table 2 may be rectangular, as shown, or may be circular or otherwise shaped, as may be desired. A second pair of tracks 5 is arranged perpendicular, parallel or otherwise adjacent to the tracks 4, and a table 6 which may be similar to the table 2 is arranged to run on the tracks 5 between the positions shown in full lines and dotted lines on Fig. 2.

Overhead tracks 8 mounted on supports 9 extend across the tracks 4 and beside the tracks 5. A crane 10 provided with wheels 11 running on the tracks 8 is arranged to travel between the full-line position shown in Fig. 2, where it is above the tracks 5, to the position shown in dotted lines on Fig. 2, where it is above the tracks 4. A rectangular frame 12 is suspended from the crane 10 by means of rods 13 which are provided at their upper and lower ends with eyes engaging eye-bolts 14 or the like carried by the crane 10 and the frame 12, respectively. The vertical length of the rods 13 is made adjustable by means of turnbuckles 15. This arrangement provides for a certain amount of horizontal swinging movement of the frame 12 while maintaining this frame always level.

As best shown on Fig. 4, the frame 12 carries another frame 18 which is movable vertically with respect to the frame 12 and carries a series of vacuum cups arranged to lift and transport the pieces of glass in the manner described above. The frame 18, as shown, is composed of longitudinal channel bars 19 and transverse angle bars 20 arranged in pairs beneath the longitudinal bars 19. Other transverse bars 21 are secured to the upper flanges of the channel bars 19 and serve to support suspension members 22 which carry bearings 23 provided at their upper ends with circular seats in which are received eccentrics 24 carried by horizontal shafts 25 that are mounted in bearings 26 carried by the frame 12. The shafts 25 also carry spur gear wheels 27 meshing with an intermediate gear wheel 28 on a shaft 29. The gear wheel 28 meshes with a pinion 30 on the armature shaft 31 of an electric motor 32 which is suspended beneath transverse angle bars 33 forming part of the frame 12.

The motor and gearing just described provide means for raising and lowering the frame 18 which carries the vacuum cups. When the motor 32 is started the pinion 31 acts through the gear wheel 28 to rotate the gear wheels 27 and consequently the shafts 25 and the eccentrics 24, thus changing the angular position of the eccentrics 24 and raising or lowering the frame 18. The motor 32 is provided with the usual circuit connections and reversing switch, which it is not considered necessary to illustrate herein.

The transverse angle bars 20 of the frame 18 serve the double purpose of supporting the vacuum cups and of determining the upper level of the glass that is to be laid, the cups being supported upon the upper horizontal flanges 20ª of these bars, while the lower edges 20ᵇ of the vertical flanges serve as limit-stops to fix the upper level of the glass.

The construction of the vacuum cups is best shown in Figs. 5 to 7. Each of these devices consists of a suction cup 35 composed of rubber or other elastic material and carried by a rigid housing 36 which conforms to the shape of the rubber cup 35 and is suspended from a plate 37 which extends across the space between a pair of the angle bars 20 and is removably fastened to the upper flanges of these bars by means of bolts 38 and nuts 39. The under surface of the hollow central portion of the housing 36 may be provided with saw-tooth grooves 40 in order to prevent relative movement between the rubber cup 35 and the housing 36 when the apparatus is in use. The rubber cup 35 is removably secured within the housing 36 by means of a stem 41 having an enlarged head 42 and a screw-threaded outer portion 43 to which is applied a nut 44. The stem 41 has a central channel 45.

All of the vacuum cup devices just described are connected by means of suitable pipes and valves to a suction pump 46 carried by the frame 18. As shown, a manifold or header pipe 47 extends the full width of the frame 18 and communicates with longitudinal pipes 48 which in turn communicate with the individual vacuum cups through branch pipes 49 controlled by means of valves 50. The individual valves 50 are provided in order to put out of action any of the suction cups which may happen to be above the cracks between the pieces of glass that are to be transported, thus preventing the vacuum from being broken by air drawn up through these cracks.

Each of the rubber vacuum cups 35 is preferably provided with one or more annular ribs 51 extending around its upper surface near its outer edge. This rib acts as a sealing ring when the cup is forced down upon the glass and insures that proper suction will be produced even though the upper surface of the glass may be slightly wavy or rough.

In the operation of the apparatus described above, the plates or pieces of glass are first laid side by side on the table 6 without the use of any plaster, as shown for example at A on Fig. 1. The table 6 is then moved from the full-line position of Figs. 1 and 2 to the dotted-line position of Fig. 2, and the crane 10 is moved to bring the vacuum frame above the table 6. The motor 32 is then started, thus lowering the frame 18 until the rubber cups 35 engage the surfaces of the pieces of glass. The motor is then stopped and the vacuum connections are opened so as to produce suction in all of the suction cups simultaneously except in those cups which may have been cut out by means of the valves 50 on account of their position above the cracks between the plates A. The suction thus applied to the plates draws the glass vertically until the upper surfaces of the plates engage the lower edges of the angle bars 20, as shown on Fig. 7, and since the lower edges of these bars are at the same level the upper surfaces of all of the plates A are likewise at the same level. The motor 32 may then be started in the reverse direction to raise the frame 18 to its starting position, or at least to such a position that the glass is free from the table 6 and is also above the level of the plaster on the table 2 to which the glass is to be transferred.

The crane 10 is then moved along the tracks 8, carrying with it the vacuum frame and the pieces of glass, until the frame is in the dotted-line position shown in Fig. 2 immediately above the table 2 which has previously been covered with plaster in the usual manner. By again starting the motor 32 the frame 18 is lowered until the glass is embedded in the plaster, after which the motor is stopped and the frames 10 and 18 are swung horizontally by hand for the purpose of forcing the air from beneath the glass as in the ordinary swimming operation. This horizontal movement need be only a few inches in each direction, and is permitted by the loose connections at the upper and lower ends of the suspension rods 13. The swinging frame is then allowed to remain stationary until the plaster, shown at B, Fig. 7, is set sufficiently to support the glass, after which the vacuum is released, the frame 18 is lifted, and the crane 10 returns the frame to its starting position ready to transfer another table of glass which may be prepared on the table 6 while the first set of plates is being transferred and laid. The table 2 is then moved forward on the tracks 4 and is replaced by a new table which is covered with plaster just before the crane brings the next set of plates from the assembling table 6.

A sufficient number of the vacuum cups is provided to insure that plates of any size or shape shall be properly lifted and transported. It may happen that some of the vacuum cups do not extend far enough from the edge of one of the plates to have any lifting effect upon it, as shown for example in Fig. 6, where the suction cup at the left of this figure is in proper engagement with the thick plate but does not exert any suction upon the thinner plate. However, there are sufficient cups engaging the remainder of the thinner plate A, as indicated in the right of Fig. 6, to properly engage this plate and raise it to the proper position shown in Fig. 7.

The arrangement described above may be modified by omitting the crane 10 and supporting the frame 12 in a stationary position above the tracks 4 at the position of the table 2 shown on Fig. 1. The tracks 5 in this case are made to cross the tracks 4 so as to enable the table 6, with its load of glass, to be run under the stationary vacuum frame. After the glass is picked up by the suction cups, the table 6 is withdrawn from beneath the frame and the table 2 is moved under the frame and receives the glass in the manner described above.

Another modification consists in arranging the tracks 4 and 5 parallel or inclined to each other instead of at right angles, as shown in the drawings. Such arrangements may be convenient where space is not available for tracks laid at right angles.

The details of construction shown above are well suited for use in carrying out my invention, but it will be understood that my invention is not restricted to the particular construction herein shown but may be carried out by means of any other suitable apparatus.

We claim as our invention:

1. Apparatus for laying flat glass upon grinding or polishing tables, comprising a suction device adapted to engage and support the glass to be laid, and rigid seating means for permitting the surface of the glass engaged by said suction device to be alined in a definite plane.

2. Apparatus for laying flat glass upon grinding or polishing tables, comprising a suction device adapted to engage and support a plurality of pieces of glass simultaneously, and rigid seating means for permitting alignment in a common plane of all of the surfaces of the glass engaged by said suction device.

3. Apparatus for laying flat glass upon grinding or polishing tables comprising a plurality of suction cups adapted to engage a plurality of pieces of glass simultaneously, and limiting members having glass-engaging surfaces at a common level for alining the surfaces of said pieces of glass.

4. Apparatus for laying flat glass upon grinding or polishing tables comprising a frame, a plurality of suction cups carried by said frame and opening downwardly, pipes for connecting said cups to a source of suction, and horizontal bars for fixing the position of the upper surfaces of the glass engaged by said cups.

5. Apparatus for laying flat glass upon grinding or polishing tables comprising a frame, a plurality of downwardly opening suction cups carried by said frame and adapted to engage a plurality of pieces of glass simultaneously, pipes for connecting said cups to a source of suction, and horizontal bars adjacent to said cups for fixing the position of the upper surfaces of all of the pieces of glass engaged by said cups.

6. Apparatus for laying flat glass upon grinding or polishing tables comprising a frame, a plurality of downwardly opening suction cups carried by said frame and arranged in rows, pipes for connecting said cups to a source of suction, and horizontal bars disposed between said rows of cups, said bars having their lower edges at a common level and forming limit stops to align the upper surfaces of all the pieces of glass engaged by said cups.

7. Apparatus for laying flat glass upon grinding or polishing tables comprising a frame, downwardly opening suction cups carried by said frame, means for connecting said cups to a source of suction, a second frame, means for suspending said first-named frame from said second frame, and means carried by said second frame for raising and lowering said first-named frame, said raising and lowering means comprising horizontal shafts carried by said second frame, eccentrics secured to said shafts, suspension members secured to said first-named frame, and suspended from said eccentrics, and means for rotating the said shafts.

8. Apparatus for laying flat glass upon grinding or polishing tables comprising a frame, downwardly opening suction cups carried by said frame, means for connecting said cups to a source of suction, a second frame, means for suspending said first-named frame from said second frame, and means carried by said second frame for raising and lowering said first-named frame, said suspension means comprising two spaced horizontal shafts rotatably mounted in bearings carried by said second frame, eccentrics carried by said shafts, suspension members secured to said first-named frame and suspended from said eccentrics, gear wheels carried by said horizontal shafts, an intermediate gear wheel meshing with both of said first-named gear wheels, and a motor connected to rotate said intermediate gear wheel.

9. Apparatus for laying flat glass upon grinding or polishing tables comprising a frame, downwardly opening suction cups carried by said frame, means for connecting said cups to a source of suction, a second frame supporting said first-named frame, a support for said second frame and suspension rods having their lower ends loosely attached to said second frame and having their upper ends loosely attached to said support.

10. Apparatus for laying flat glass upon grinding or polishing tables comprising a frame, downwardly opening suction cups carried by said frame, means for connecting said cups to a source of suction, a second frame supporting said first-named frame, a support for said second frame, suspension rods having their lower ends loosely attached to said second frame and having their upper ends loosely attached to a support, means for adjusting the length of said rods, and means for laterally moving said support.

11. A suction cup for use in laying flat glass comprising a housing, and a cup of flexible material secured within the said housing and having its outer portion movable independently thereof, said cup having a rib formed on its upper surface near its outer edge, said rib being adapted to be compressed beneath said housing when said cup is in use.

12. A suction cup for use in laying flat glass comprising a housing, and a cup of flexible material secured within the said housing and having its outer portion movable independently thereof, said cup having a rib formed on its upper surface near its outer edge, said rib being adapted to be compressed beneath said housing when said cup is in use, and means for securing said flexible cup in said housing comprising a stem extended through said cup and through said housing, said stem having an enlarged lower end and having a channel extending therethrough, and means for connecting said stem to a source of suction.

In testimony whereof we the said FRANK E. TROUTMAN and CHARLES H. CHRISTIE have hereunto set our hands.

FRANK E. TROUTMAN.
CHARLES H. CHRISTIE.